United States Patent [19]

Watts

[11] 3,947,996

[45] Apr. 6, 1976

[54] METHOD OF COATING SEEDS TO CONTROL GERMINATION AND THE RESULTANT COATED SEEDS

[75] Inventor: Harry Watts, Sarnia, Canada

[73] Assignee: The Dow Chemical Company, Midland, Mich.

[22] Filed: Jan. 21, 1974

[21] Appl. No.: 435,041

[52] U.S. Cl. .................... 47/57.6; 427/4; 427/222; 428/407
[51] Int. Cl.² ......................................... A01C 1/06
[58] Field of Search ............ 117/3, 100 A; 47/57.6, 47/DIG. 9; 427/4

[56] References Cited
UNITED STATES PATENTS

| | | | |
|---|---|---|---|
| 3,045,394 | 7/1962 | Coulter | 117/3 |
| 3,545,129 | 12/1970 | Schreiber et al | 117/3 |
| 3,598,565 | 8/1971 | Graves | 47/57.6 |
| 3,698,133 | 10/1972 | Schreiber | 117/3 |
| 3,703,404 | 11/1972 | Kirk | 117/100 A |
| 3,803,761 | 4/1974 | Watts et al | 117/3 |
| 3,808,740 | 5/1974 | Porter et al | 117/3 |

*Primary Examiner*—Ronald H. Smith
*Assistant Examiner*—Dennis C. Konopacki
*Attorney, Agent, or Firm*—Albin R. Lindstrom

[57] ABSTRACT

A plant seed having a controlled germination time is prepared by enveloping the seed in a continuous coating of a film forming composition comprising a water insoluble polymer and polyvinyl alcohol with said coating being of a thickness of from about 0.01 to about 0.15 millimeter and having an oxygen transmission sufficiently high to maintain viability of the seed.

8 Claims, No Drawings

METHOD OF COATING SEEDS TO CONTROL GERMINATION AND THE RESULTANT COATED SEEDS

BACKGROUND OF THE INVENTION

In the prairie provinces of Canada as well as in other climatically similar regions located in other countries, the cultivation of higher yielding winter crops is impractical due to the severe winter conditions. Spring seeding is, in spite of temperatures conducive for the germination of seeds, usually delayed by three to four weeks due to adverse weather conditions, such as morning frost, high winds and excess moisture. With the relatively short growing periods available, this delay in seeding frequently prevents timely maturing of the crop and, as a rule, reflects adversely in yields and qualities of various crops.

Other areas of the world have different but equally vexatious climatic problems to the attainment of a maximum growing season. For example, some areas have a short rainy season in the spring which is sufficient with the natural seed to induce germination but insufficient to bring the crop to maturity. That season is followed by an arid period during which the young seedlings will have a high mortality. Subsequently, the optimum conditions arrive but too late to save much of the crop. If planting is delayed until the optimum conditions, obviously a significant part of the growing season is used up in the induction of germination. If planted too early the germinated seeds will perish.

Still other areas have different climatic cycles that make attainment of the maximum period of optimum growing time virtually impossible in a practical sense.

DESCRIPTION OF THE PRIOR ART

In U.S. Pat. No. 3,545,129 (Canadian Pat. No. 836,461) there is described a system for coating seeds to prevent premature germination. That system utilizes three separate coatings of different composition to achieve that end. The coatings involved were a porous inner coat, an intermediate coat to separate the inner and outer coats, and an outer coat to provide environmental protection. Such a system requires the inventory of three separate coating compositions, three coating steps, a relatively thick coating that increases coating weight and storage space.

Canadian Pat. No. 901,310 describes a similar system utilizing the porous inner coat and the coat for coating seeds.

British Pat. No. 1,071,804 describes a system for coating seeds to achieve a delayed germination. That patent teaches the use of numerous polymeric coatings in achieving the objectives.

SUMMARY OF THE INVENTION

The benefits and advantages of the present invention are achieved with a seed having a non-phytotoxic coating thereon, the coating comprising a material having (a) a permeability to water such that a seed coating made therefrom will control the water imbibition of the seed to the extent necessary to delay germination until environmental conditions are satisfactory to continued crop growth, and (b) physical properties of such a character that the coating will rupture when the seed has passed the period of needing protection and has entered the period when germination and growth are desired.

Although the invention is useful with all seeds, it is principally adapted to be employed with seeds of plants that reach maturity in one growing season. Typical of such plants are the grasses and grains such as barley, oats, triticale, corn, sunflower, sugar beets, rape, safflower, flax, canary grass, tomatoes, cotton seed, and peanuts.

The invention also comprehends the seed coating process comprising the deposition of a thin enveloping coating of a suitable material onto the seed.

Basically the concept of the present invention is such that the coating will (1) maintain its integrity during periods of climatic conditions that might or might not induce germination with uncoated seeds but in either event would be unfavorable for continued crop growth and (2) will lose its integrity under such climatic conditions favorable to both germination and continued crop growth. Thus the inventive concept permits the tailoring of seed coatings for achieving optimum germination and growth while allowing early planting within a wide time period. Other advantages also accrue from the concept. For example, the seeds are protected from fungal growth, insects and microorganisms. In addition, additives such as fungicides can be formulated into the coating composition to improve the storage life of the seeds. Other additives such as inert fillers may also be used for any particular function that might be desired. The automatic synchronization of the germination of the seed and growth of the plant to the optimum climatic conditions is the principal benefit. The concept is of equal utility in prairie provinces of Canada and the northern plain states of the United States where survival over a cold season is the problem and in those areas of the world, such as the Middle East and parts of Australia, where survival over a hot arid season is desired, as well as in other parts of the world wherever environmental problems exist.

The coating provides the prime resistance to undesirable environmental conditions which would permit an untreated seed to germinate but would restrict and hinder its continued growth and development and possibly kill the seedling. At the same time, the coating integrity must be inherently degradable under agronomically suitable environmental conditions such that germination and growth will not be unduly delayed. To achieve that goal the coating must be continuous, and be of a composition having the desired characteristics when applied in a practical thickness.

The coating must have an oxygen permeability such that sufficient oxygen will be transmitted to permit normal respiration of the seed. It is difficult to assign a precise value to the requisite permeability because it will vary somewhat from seed to seed and the oxygen requirements are not measured with a high degree of reliability. Also, for some seeds, that value may not have been determined requiring routine experimentation. Oxygen transmission values for many polymeric coatings are published in the literature or, if not, may be determined by simple preliminary experiment. In general, any coating that meets the herein required water-vapor transmission limitation will also demonstrate adequate, even though possibly not optimum, oxygen permeability.

The coating must be of a film forming composition which is capable of deposition onto the seed in the desired thickness. Many materials are satisfactory as the film forming component of the outer coating.

An advantageous genus of water insoluble polymers includes the synthetic man-made polymers prepared by the polymerization of monomeric entities. The latter group of synthetic polymers is readily available, permits easy tailoring of properties for a given situation, and is useful with a variety of conventional application techniques utilizing existing coating equipment.

Typical of those polymers are the polymers and interpolymers of ethylenically unsaturated monomers including vinyl chloride, vinylidene chloride, vinyl alkanoates, such as vinyl acetate, and the alkyl acrylates and methacrylates. To achieve the most useful properties of the coating as well as facile film formability, it is usually desirable to interpolymerize two or more of the monomers. That is readily accomplished by known polymerization methods.

Also representative of the preferred subgenus are the polymers prepared by condensation polymerization of monomers to form polyesters, polyamides and other known species resulting from this technique.

The above delineation of synthetic polymers is intended only to be exemplary of those useful herein. Standard reference works in the literature of polymers will suggest other monomer combinations meeting the criteria for functioning in the present invention. Polymer systems having marginal film formability may have that characteristic upgraded by incorporation of small amounts of known plasticizers. Likewise, some polymer systems require stabilization to inhibit degradation of their properties and the inclusion of light, heat, oxidation and other stabilizers is within the comprehension of this concept. Further, it may be desirable to color code seeds of different species, of different distributors or for other reasons so that inclusion of conventional colorants is comprehended. Any additive incorporated in the coating composition should be able to perform its intended function without detracting unduly from the coating properties or affecting the seed.

The other essential ingredient of the coating is polyvinyl alcohol. By that material is meant the product of the hydrolysis of polyvinyl acetate to an extent needed to achieve water solubility. With most molecular weight materials that will be at least about 75 percent hydrolyzed. In addition to water solubility, which affects the ease of preparation of the coating composition, the amount of hydrolysis also affects the time delay achieved with the coating.

The amount of polyvinyl alcohol to be used depends upon several factors including, for example, the water solubility of the polyvinyl alcohol, the water permeability desired, the time delay required, the nature of the water insoluble polymer, the seed being coated and others. The optimum amount may be readily determined by simple preliminary experiment. As a general rule the amount will be in the range of about 0.5 to 5 weight percent based on the combined weight of polyvinyl alcohol and water insoluble polymer.

Depending upon the coating apparatus and technique employed, the film forming component may be deposited from a variety of coating media. Aqueous latexes are a particularly useful and versatile form for preparing the desired formulation and for depositing the coating and accordingly are preferred.

The water insoluble polymer and the polyvinyl alcohol should be thoroughly and uniformly blended. This is conveniently done by slowly adding an aqueous solution of the polyvinyl alcohol to the latex while stirring.

A useful coating procedure employs a rotary drum wherein the seed is tumbled while the coating composition is sprayed thereon and a stream of hot air is directed at the coated seeds. The inlet air temperature and coating composition feed rate are controlled so the temperature of the bed of seeds is maintained between about 80° to 120°F as determined by a thermocouple probe in the bed. The optimum temperature will depend on the seed being coated and the particular coating composition being applied.

EXAMPLE 1

Using the above mentioned rotary drum coating method, 908 grams of rapeseed were coated with a blend of 147.8 milliliters of latex (50 percent solids) and 147.8 milliliters of a solution containing 2 percent of a polyvinyl alcohol (99 percent hydrolyzed) based on latex solids. The seeds were planted in Manitoba and Ontario in the fall. The following spring 92 percent of the seeds emerged in Manitoba and 82 percent in Ontario. Bare seed planted at the same time as a control was killed by frost and failed to emerge in the spring.

This example shows that a given coating formulation performs well under markedly different climatic conditions, thus illustrating a measure of freedom from climatic differences not found in the subject of Canadian patent application Ser. No. 135,598, when the same latex was used with no added water soluble polymer.

This latex was a copolymer of 75 percent vinylidene chloride, 20 percent vinyl chloride and 5 percent ethyl acrylate.

EXAMPLE 2

Nine hundred eight grams of corn were coated with 73.9 milliliters of latex (50 percent solids) blended with 73.9 milliliters of an aqueous solution containing 1 percent by weight (based on latex solids) of polyvinyl alcohol (99 percent hydrolyzed).

The seeds were planted in Manitoba in the fall. The following spring, 82 percent of the seeds emerged. Uncoated seeds planted at the same time failed to emerge.

EXAMPLE 3

Rapeseed was coated as described in Example 1 but using 1 percent by weight of polyvinyl alcohol (88 percent hydrolyzed). The seeds were planted in Manitoba in the fall. In the following spring, 92 percent emerged. Bare seed planted at the same time failed to emerge.

EXAMPLE 4

Varying coating weights of formulations containing 1 or 2 weight percent of 88 or 99 percent hydrolyzed polyvinyl alcohol were coated on three different species of rapeseed. The latex and coating technique employed were those of Example 1. The coated seeds were planted in the fall in Winnipeg, Canada together with uncoated seeds. The results are shown in the following table.

TABLE

| Seed Variety | Pounds of Latex Solids per 60 lbs. of Seeds | Coating Formulation Hydrolyzed PVA Added to 100 pts of Latex Solids | | | |
|---|---|---|---|---|---|
| | | 88% | | 99% | |
| | | 1 | 2 | 1 | 2 |
| ORO | 3 | 0 | 47 | 10 | 0 |
| | 6 | 25 | 75 | 80 | 80 |
| | 9 | 15 | 60 | 60 | 75 |
| SPAN | 6 | 92 | 80 | 15 | 92 |
| | 9 | 25 | 75 | 15 | 80 |
| ZEPHYR | 6 | 65 | 75 | 65 | 78 |
| | 9 | 50 | 75 | 40 | 55 |

The uncoated seeds had zero emergence.

The same species of seed coated with the same formulations in the same manner were also planted in Sarnia, Ontario with similar results to those tabulated above.

What is claimed is:

1. A seed enveloped in a continuous adherent coating to control germination until environmental conditions are satisfactory to continued crop growth wherein said coating consists essentially of a uniform blend of an aqueous latex of insoluble polymer and from 0.5 to 5 weight percent of polyvinyl alcohol wherein said weight percent is based upon the combined weight of polyvinyl alcohol and water insoluble polymer and drying the composition to provide a coating having an oxygen permeability sufficient to permit normal respiration of the seed and from 0.01 to 0.15 mm thickness on said seeds.

2. The seed claimed in claim 1 wherein said water insoluble polymer is an interpolymer of vinylidene chloride and at least one other ethylenically unsaturated comonomer.

3. The seed claimed in claim 2 wherein said interpolymer is composed of from 70 to 85 weight percent vinylidene chloride, from 15 to 30 weight percent vinyl chloride and from 0 to 10 weight percent of an alkyl acrylate or methacrylate wherein the alkyl contains from 1 to 8 carbon atoms.

4. The seed claimed in claim 3 wherein said interpolymer is composed of about 75 percent vinylidene chloride, about 20 weight percent vinyl chloride and about 5 weight percent ethyl acrylate.

5. A process for the preparation of coated seeds which comprises depositing on the surface of the seeds a thin film of a coating composition consisting essentially of a uniform blend of an aqueous latex of a water insoluble polymer and from 0.5 to 5 weight percent of polyvinyl alcohol wherein said weight percent is based upon the combined weight of polyvinyl alcohol and water insoluble polymer and drying the composition to provide a coating having an oxygen permeability sufficient to permit normal respiration of the seed and from 0.01 to 0.15 mm thickness on said seeds.

6. The process of claim 5 wherein said water insoluble polymer is a vinylidene chloride polymer.

7. The process claimed in claim 6 wherein said interpolymer is composed of from 70 to 85 weight percent vinylidene chloride, from 15 to 30 weight percent vinyl chloride and from 0 to 10 weight percent of an alkyl acrylate or methacrylate wherein the alkyl group contains from 1 to 8 carbon atoms.

8. The process of claim 7 wherein said vinylidene chloride polymer is an interpolymer of about 75 weight percent vinylidene chloride, about 20 weight percent vinyl chloride and 5 weight percent ethylacrylate.

* * * * *